United States Patent
Lahey et al.

(10) Patent No.: US 6,239,802 B1
(45) Date of Patent: *May 29, 2001

(54) FILE MENU OPTION FOR MAKING FILE TEMPLATES FROM PRE-EXISTING FILES

(75) Inventors: Leonard Corning Lahey, Boulder; Deborah Elisabeth Neuhard; Dwight Ross Palmer, both of Longmont, all of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,627

(22) Filed: Sep. 15, 1997

(51) Int. Cl.[7] ................................... G06F 15/00
(52) U.S. Cl. ................... 345/352; 707/203; 707/507; 707/511
(58) Field of Search ................... 345/326, 352; 707/202, 203, 204, 505, 506, 507, 511, 530

(56) References Cited

U.S. PATENT DOCUMENTS 5,718,520 * 2/1998 MacKay ................. 400/61
5,819,293 * 10/1998 Comer et al. ............ 707/203

FOREIGN PATENT DOCUMENTS

| WO9507510 | 3/1995 | (EP) | G06F/17/24 |
| WO9707454 | 2/1997 | (EP) | G06F/9/46 |

OTHER PUBLICATIONS

Computer Screen dumps 1–8, 1996.*
Robert Cowart, Matering Window 95, Sybex Inc, pp 41–42, 488–493, 1995.*

* cited by examiner

Primary Examiner—Ba Huynh
(74) Attorney, Agent, or Firm—Altera Law Group, LLC

(57) ABSTRACT

A system, method, and program of this invention enable a user to create a new file that is like a pre-existing file. When a file menu option, referred to herein as "New Like", is selected by a user, an "Open" dialog is displayed to a user which enables the user to specify any pre-existing file to be opened. When the pre-existing file is opened as the new file, the new file is opened without the pre-existing file name being associated with the new file. The new file contains a subportion of the data of the pre-existing file that has been designated to be copied from the pre-existing file to the new file upon the opening of the specified pre-existing file. Upon saving the new file for the first time, the user interface requires the user to save the new file under a new file name. As such, any pre-existing file can be used as a template for a new file without any accidental modifications to the pre-existing file and without managing special template files.

16 Claims, 5 Drawing Sheets

FILE MENU OPTION FOR MAKING FILE TEMPLATES FROM PRE-EXISTING FILES

CROSS-REFERENCE TO RELATED APPLICATION

This application is related by common inventorship and subject matter to copending patent application Ser. No. 08/929,609 entitled "Method for Creating and Organizing a Job Ticket in a Network Printing System" filed on even date herewith, assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a graphical user interface for creating new files and opening pre-existing files, and more specifically to creating new files by using a pre-existing file as the basis for the created new file.

2. Description of the Related Art

In word processing programs that enable a user to create and edit documents, and in other programs that enable a user to create and open files, it is desirable for a user to be able to use boilerplate data as a basis for creating other files. For example, a user may want to send the same letter to different people. In this example, the body of the letter would be the boilerplate data, while the addressee information would be unique for each letter. In another example, a user may create multiple patent application documents. In this example, the headings of the documents—"Description of the Related Art", "Summary of the Invention", "Description of the Preferred Embodiment", "Claims" and "Abstract"—would be the boilerplate data used in each document, while the body of each section would be unique for each patent application document. In yet another example, an invoice form may contain boilerplate information such as the headings of the fields and the identity of the entity to which monies are owed. The unique data for each invoice may include the specific amount of money, a description of the parts or services for which the money is owed, and the identity of the person owing the money. When preparing a specific invoice, a user may wish to open an invoice template that can be used for filling in the appropriate unique data in the pre-established boilerplate form layout.

Microsoft® Word has a template function that allows one to save a file as a template. Saving a file specifically as a template is a separate menu item. These files are then saved with a special extension, e.g., such as "*.tmp". These files can then be used as a template for future files. The template has associated with it the relevant fonts and boilerplate data. However, a separate process is involved in making a file a template. For example, a user has to invoke a function to make a file a template. Then, a user has to remember where the templates are, and which named template has the desired boilerplate data. The user also has to remember to invoke the right template when the new file is opened and to add the template to it. When a document is opened, the user specifies which templates are to be applied. In Microsoft® Word, more than one template can be applied to a same document.

In Lotus® AmiPro, when a user chooses to create a new file, e.g., document, the user is given a list of templates, referred to as style sheets, for the user to select to apply to the document.

Also, in some programs that have a template function, the templates are retrieved as the user's new document under the template name. The user then works directly with the template to create a document from the template. However, if the user forgets to save the document as a different file name than the template name, the original boilerplate template will no longer exist; i.e., the original template will have been modified with any changes and so modification made by the user.

As such, in currently existing programs, if a user desires to use certain boilerplate data in a new file, that boilerplate data has to exist in a template, or the user has to create such a template first before using it. This typically requires additional steps that are separate and distinct from creating the new file.

In general, managing templates can become cumbersome for a user. An alternative approach can be used by a user that accomplishes the same function as templates but the user does not have to invoke the template futnction. The user can open a document, use that document as the basis for another document by making additions and modifications to the opened document, and then save the opened document as a new file with a new filename. The original opened file remains as it was at the time it was first opened under its original filename while a new file, based upon the opened file, now exists under a new filename. This allows users to use existing documents over and over again by opening an old, i.e., pre-existing, document, making changes to it, and saving it under a new name. Again, if a user forgets to rename it, e.g., by clicking on a save menu option instead of a "save as" menu option, the original pre-existing document is automatically lost. The original file name now contains the user's modifications and not the original document that was being used as the boilerplate.

SUMMARY OF THE INVENTION

It is therefore an object of this invention to enable a user to easily create a new file like any pre-existing file by using the pre-existing file as a template without any of the user burdens associated with managing templates or the burden of remembering to save the new file under a new name.

The system, method, and program of this invention allows any file, e.g., document, form, etc., to be used as a template at anytime. The preferred embodiment has a new option within the choices of a "file" menu that enables a user to open a new file that is like, i.e., similar, in some respects, to another file. This enables any file to be used as a template for a new file. In a preferred embodiment, this menu option is known as "New Like". Also, in the preferred embodiment, this menu option is displayed within the "File" menu choices between "New" and "Open". The "New Like" option has some characteristics of creating a new file using the "File" "New" menu option function, and some characteristics of opening an already existing file using the "File" "Open" menu option function. That is, the "New Like" file option creates a new file that is like an already existing file. A user uses only a single action icon to do this.

When a user selects "File" and "New Like", a "File Open" dialog box is displayed to the user. The user selects or specifies any file to be opened. When the file is opened, the program makes a copy of the file in working memory and removes the filename from the file. The file is displayed to the user.

In some embodiments, especially for those embodiments using a specific application that only interacts with files having a same structure or layout, the application program may dictate what parts of the file are copied over to the "new" file and which parts are left "blank" for the user of the new file to fill in. In these embodiments, the displayed file only contains the portions of data from the file that have been designated as "common" data for "New Like" files. In other, more general embodiments, the complete original file is displayed to the user along with menu options allowing the user to specify what parts of the file (such as all headings, bold type, or specific selected portions) are to be kept or deleted.

Along with the file, or portions of the file as initially displayed, a "save as" dialog is displayed that requires the user to give the "New Like" file a new name.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

A preferred embodiment of the invention is used in a print submit program that uses job tickets as described in copending application Ser. No. 08/929,609 (Internal Docket Number AM9-97-100) filed on even date herewith and incorporated herein by reference. The job ticket has a certain structure with attributes. A job ticket allows a user to specify various combinations of files for printing and to specify other parameters for printing those files, such as the printer, type of paper to be used, etc. A "New Like" file menu option allows a user to specify new print jobs by using a previous job ticket as a template. For example, aspects of a print job, such as the files to be printed, may be printed over and over again. However, some aspects of the print job may vary with each printing, such as the customer name and/or the print job ID. The "New Like" file menu function allows users to set up the job ticket as a template so that portions of the job ticket can be used over and over again without having the burden of managing templates.

Figure 1A:
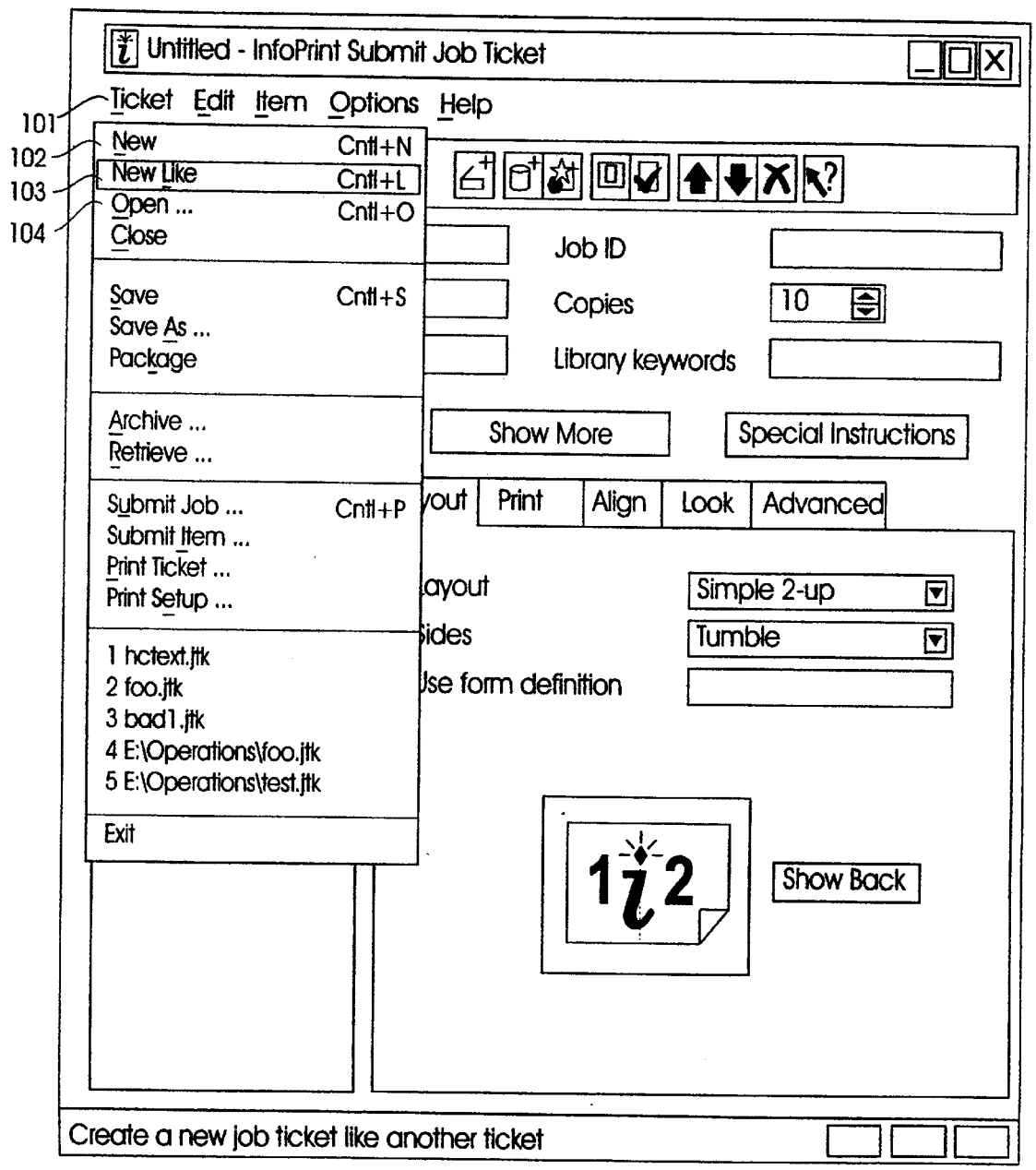
FIGS. 1A and 1B illustrate a file menu including "New Like" as one of the menu options to be chosen by a user.
Figure 1B:
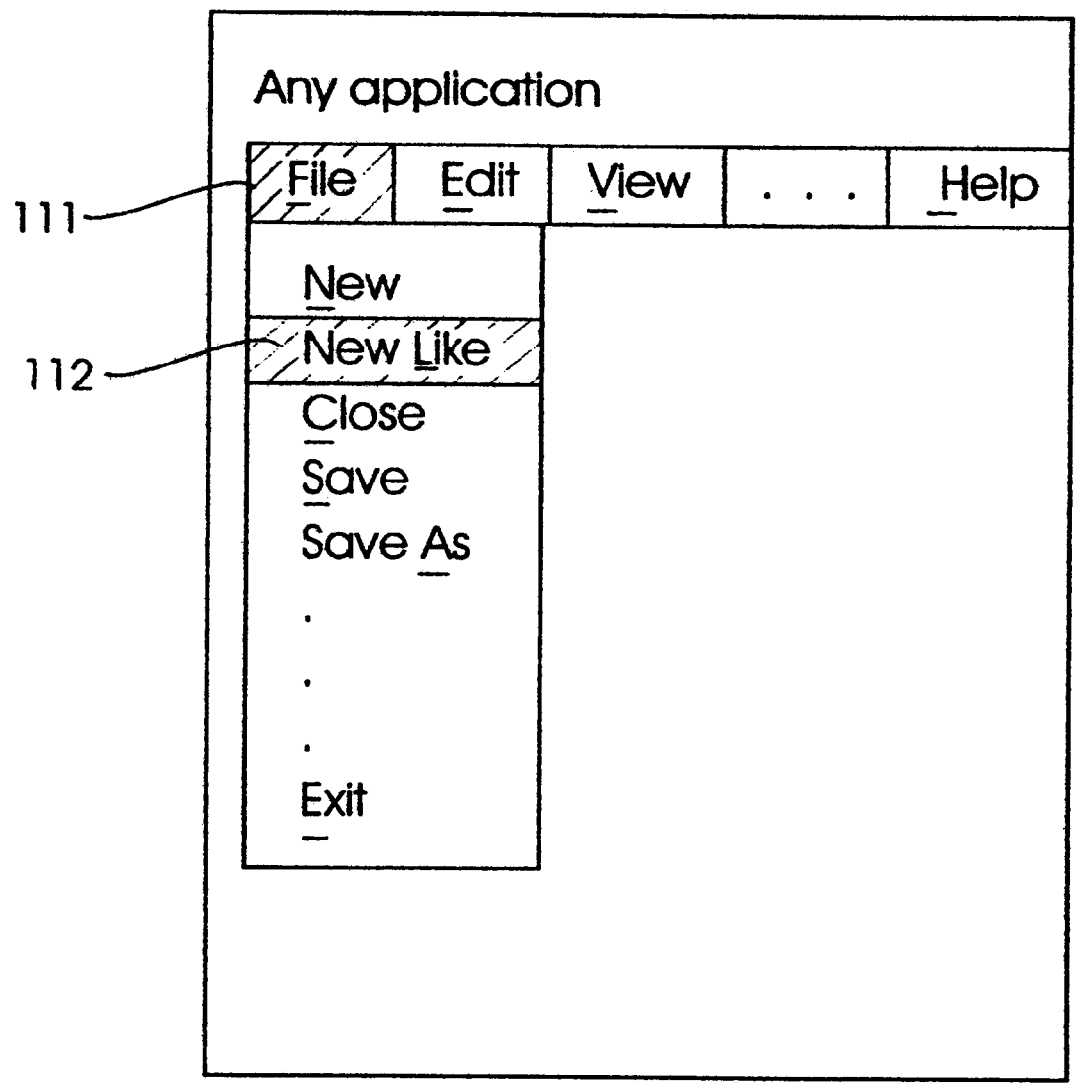
Figure 2:
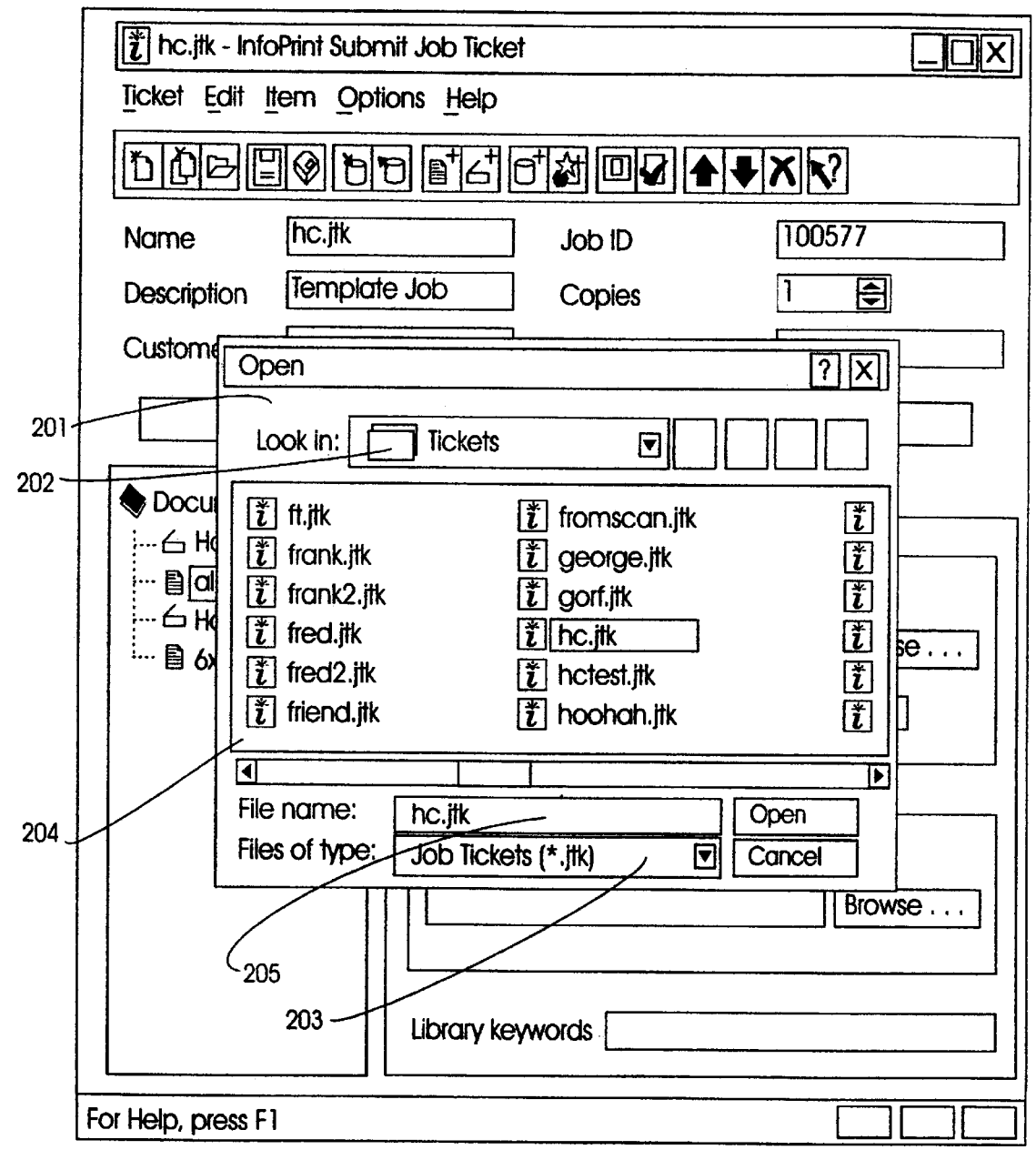
FIG. 2 illustrates an open dialog box for specifying any file as the "template"

More specifically, in a preferred embodiment of the invention, as illustrated in the Figures, an existing file, i.e., a job ticket, is opened under a "New Like" file menu option 103, FIG. 1A. The user selects the "Ticket" menu option 101 (or in a more general embodiment shown in FIG. 1B, "File" menu option 111), then "New Like" 103, FIG. 1A (or 113, FIG. 1B). The "New Like" menu item 103 appears between the "New" menu item 101 and the "Open" menu item 104, as shown in FIG. 1A. As shown in FIG. 2, after the user selects "New Like", an "Open" dialog 201 is displayed to the user. Using this dialog, the user can choose any job ticket as the "template", i.e., as the basis for the new job ticket. Like other "open" dialogs, the "Open" dialog allows a user to select a drive and/or directory in the combo box 202 or a type of file in another combo box 203. The dialog displays to a user the files (e.g., job tickets) 204 within that directory and/or drive selected in the combo box 202. The user can select any file from those displayed or change directories or type in a new path name of a file in the type in field 205. FIG. 2 shows that the user has chosen "hc.jtk" as the job ticket to be opened under "New Like".

As such, the desired file is designated to be opened by the user. However, instead of just opening the file, the system makes a copy of the file in the application's working memory, and the name is removed from that copy. In the preferred embodiment for job tickets, the job ID is also removed from the opened job ticket that is being saved in memory.

When the "New Like" file menu option is selected, a new job ticket is created, the old job ticket is opened and pertinent information is copied from the old job ticket to the new job ticket, and the job ID is omitted. When the "New Like" file menu option is selected, a dialog box is displayed to the user. In the preferred embodiment, a programmer writing the application for handling job tickets has predetermined which items or data should be initialized to the new job ticket, i.e., which items or data should be copied from the old job ticket to the new job ticket. As such, the old job ticket is being used in a way similar to a template.

As a result, there is a new ticket that has some of the fields automatically filled in. When a user wants to save this new ticket, the user has to give the new job ticket a new name since no name is currently associated with the "New Like" job ticket. The dialog box automatically requires that the user give the new job ticket a name, i.e., the dialog box asks the user for a "file" name in a "save as" field. In this way, the old ticket cannot be overwritten.

With this invention, the user does not have the burden of thinking about templates, finding the right template, and applying the templates to a file, document, job ticket, etc. Instead, any pre-existing job ticket can be used as the "template" or old job ticket when creating a "New Like" job ticket. This "New Like" file menu option is for using a job ticket as a template. A user could also create a "template" job ticket using techniques known in the art, such as by creating a new job ticket and only filling in certain fields with data that will be common to future job tickets. This new job ticket with the common data is then saved under a designated name. The designated name for the new job ticket can then be used in the "new-like" file menu function for creating a "new-like" job ticket.

Figure 3:
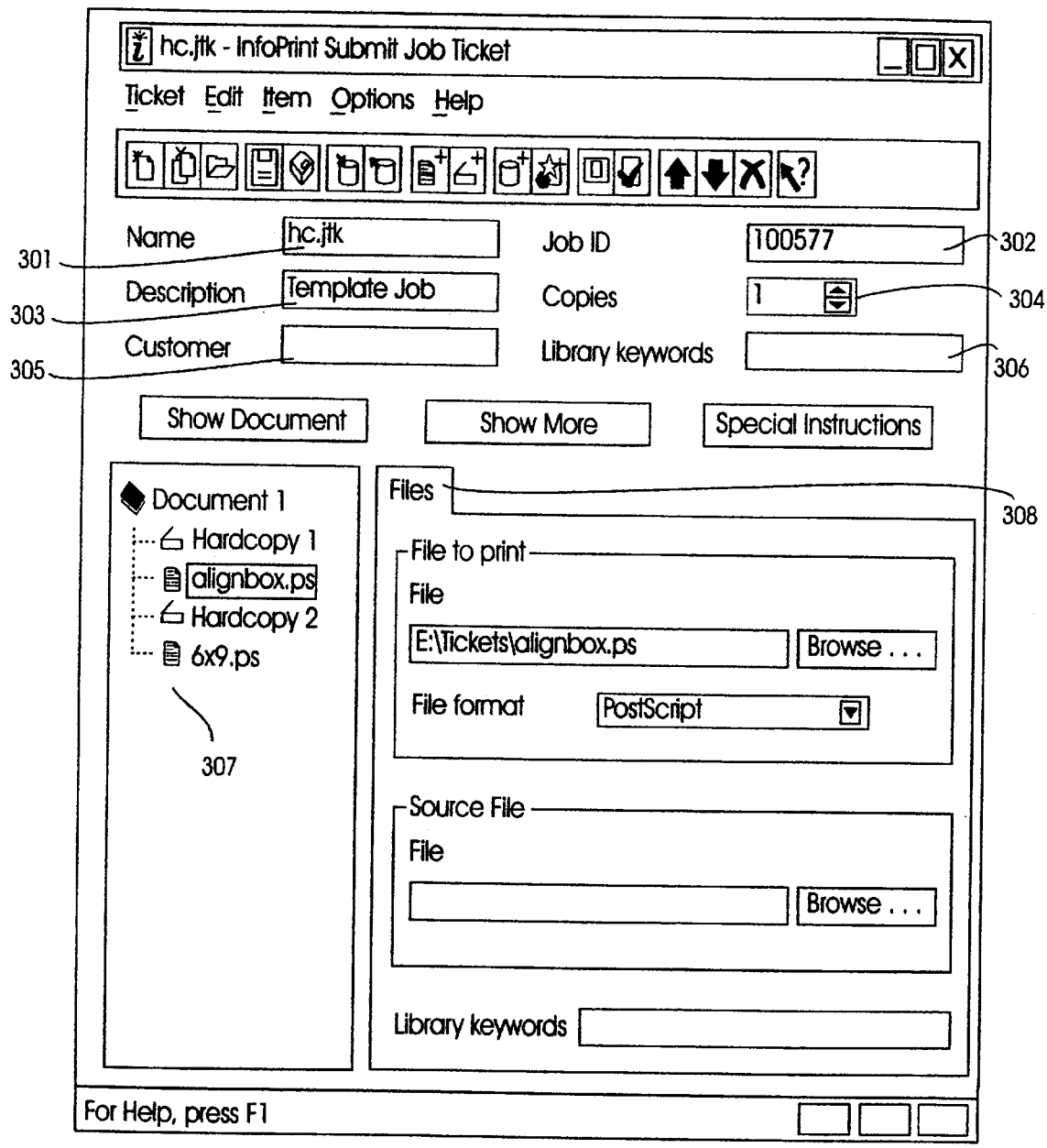
FIG. 3 illustrates a file, i.e., a job ticket, in a preferred embodiment of the invention, that can be used as a template with the "New Like" function.

FIG. 3 shows a job ticket. There are six fields at the top: ticket name 301, job ID 302, description 303, number of copies 304, customer name or identifier 305, and a library keyword 306. There is also a tree view of the job ticket contents 307, i.e., which files are associated with the job ticket and the order of the files. To the right of the tree view is a tab dialog 308 showing the attributes of the job ticket. In the preferred embodiment, all of the attributes are copied over to the new ticket.

Figure 4:
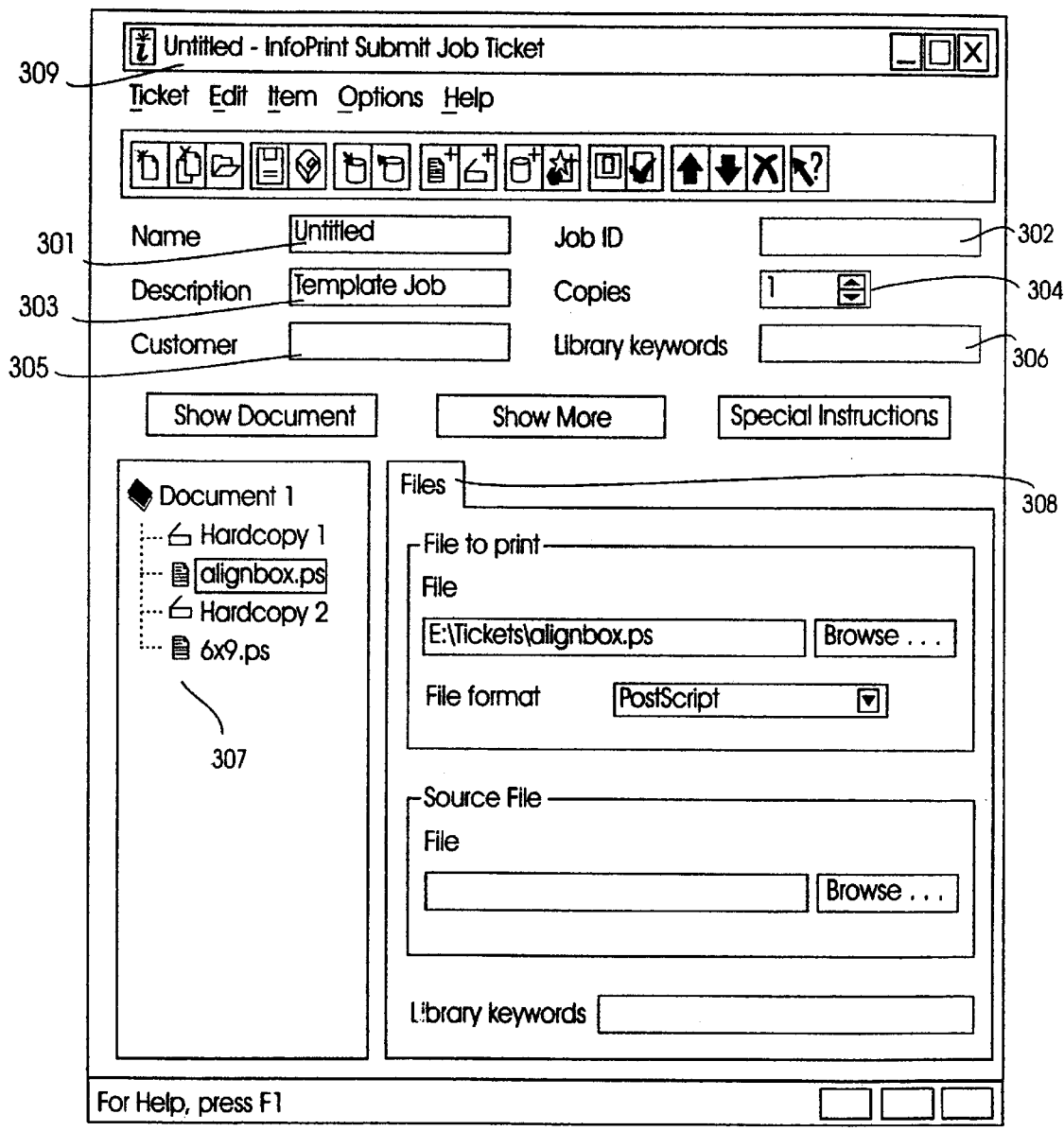
FIG. 4 illustrates portions of a file, i.e., a job ticket, in a preferred embodiment of the invention, that is a new ticket initialized from an existing ticket that was used as a template.

FIG. 4 shows a new copy of a job ticket after the user has selected "New Like" from the "Ticket" (or "File") menu, and has chosen "hc.jtk" from the "Open" dialog box of FIG. 2. Note that the name 301, 309 of the job ticket is untitled, i.e., there is no name associated with this file, yet; and the job ID 302 from the opened "hc.jtk" file has been removed. Some aspects of the opened job ticket "hcjtk" have been copied to this new untitled job ticket such as the job ticket contents containing the files 307 to be printed. As shown, this new job ticket has some of the fields automatically filled in.

In contrast, FIG. 3 showed the job ticket "hc.jtk" that had been opened under the "Open" menu option from the "Ticket" (or "File") menu. Note that the name 301, 309 and job ID 302 remain a part of the opened ticket under the "Open" menu selection.

The above has described a preferred embodiment of the invention in relation to an application that handles files of a certain type such as job tickets for print job submissions. However, the system, method, and program of this invention are applicable to any type of file and for any type of application.

As another example, the "New Like" file menu function can be used in a word processing program. Typically, word processing documents may contain the following parts:

Front Matter (title page, contents page, preface, etc.)

Body Text (chapters, sections, paragraphs, figures, tables)

End Matter (index, bibliography, etc.)

For each of these parts, word processing documents define:

the style (font, size, spacing, alignment, etc.);

the structure (e.g., each chapter may begin with a section called "Introduction"); and the content.

When using an existing document as a template for the "New Like" function, some of the above elements will carry over from the template document into the new document and some will not. For example, the name of the document will not carry over into the new document. The main content of the document will not carry over because each new document has its own information to provide. However, the style of each part would carry over so that the font and alignment choices could be reused.

A program could decide in advance which elements would carry over, or a program could provide a user interface to let each user decide which elements should carry over. There is a trade-off between functional richness and user-interface complexity here. The following describes three different methods which take into account varying trade-offs between functional richness and user-interface complexity.

The most flexible and rich method would let each user define which elements in a document should be used in the "New Like" function. A possible user interface would let users select an element (say a paragraph, or the document outline) and invoke a "Mark for New Like" function. This would produce a dialog that lets users select any or all of style, structure, and content that would be copied to a new document when "New Like" is invoked. The user selection is stored with the document so that each document can have its own set of "New Like" features to be copied.

A simpler user interface that is slightly less flexible is a user preference that specifies which elements are copied for all documents. This lets the user specify common features once without having to select them for each document. Again, these elements to copy would be stored with the document.

The least flexible method, with no user interface, has the program define which elements will be copied for all documents.

The desired human factors of each individual program will determine the mix of these three methods.

The following pseudo-code describes a preferred embodiment of the invention:

// Ask user to choose a document to use as a template.
// This can be any document; it is the normal "file open" dialog filename=GetDocumentFileName();
// initialize the current document as if "file new" had been // selected
thisDocument.DoFileNew();
// read the selected document into the new structure making a // copy in RAM to be edited when this function is exited
thisDocument.LoadFrom(filename);
// reinitialize areas of the new document that are not // appropriate to copy from the template document (e.g., the // name)
// thisDocument.name=NULL;
// thisDocument.id=NULL;
// return to processing the new document Copyright IBM Corporation 1997

Although a preferred embodiment of the invention can run on a Windows/NT or Macintosh system, embodiments of the invention can be implemented in any application program or operating system (and on any associated hardware platform) that enables the opening and creating of files by a user.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges; telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention, and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations may include the following:

- user input may be received from the keyboard, mouse, pen, voice, touch screen, or any other means by which a human can input data to a computer, including through other programs such as application programs;
- the file menu function "New Like" described above may have any name, and not necessarily "New Like"; and
- the above-described "New Like" file menu function may be applicable to any files including, but not limited to, job tickets, documents, forms, etc.

We claim:

1. A system for directly creating a new file from pre-existing file comprising:
   means for displaying to a user a selectable option for directly creating a new file based on the pre-existing file;
   means for receiving as input a file name of the pre-existing file in response to execution of the selectable option for directly creating the new file;
   means for the user to selectively copying part or the entire information from the pre-existing file to create the new file in response to input of the pre-existing file name and the new file is created devoid of a file name, wherein the pre-existing file remains unchanged and disassociated from the new file;
   means for denying assignment of a new file name to the new file upon creation of the new file;
   means for allowing modification of the new file without changing the pre-existing file or requiring designation of a new file name; and
   means for requiring a designation of a new file name for the new file upon a first save of the new file.

2. The system of claim 1 wherein the predetermined information includes at least a subportion of the data of the pre-existing file.

3. The system of claim 1 wherein the file is a job ticket for submitting print jobs to a printer.

4. The system of claim 1 wherein the file is a document and the selectable option is a part of a word processing program menu.

5. The system of claim 1 wherein the file is a form having pre-established headings.

6. The system of claim 5 wherein the pre-established headings are copied to the new file stored in memory from the pre-existing file and data unique to each form is not copied from the pre-existing file to the new file.

7. A computer-implemented method for directly creating a desired document from a pre-existing file comprising:
   displaying to a user a selectable option for creating a new file based on the pre-existing file;
   receiving as input a file name of the pre-existing file, wherein receipt of the pre-existing file name is available in response to execution of the selectable option for creating the new file;
   creating the new file by selectively copying by the user part or the entire information from the pre-existing file to the new file in response to input of the pre-existing file name, wherein the new file is created devoid of a file name; and
   allowing modification of the new file without requiring designation of a new file name for the new file and without affecting the pre-existing file;
   requiring a designation of a new file name for the new file upon a first save of the new file by the user, wherein the new file resulting therefrom becomes the desired document requiring no intermediary file to create the desired document therefrom.

8. The method of claim 7 further comprising copying at least a subportion of the data of the pre-existing file in the new file.

9. A method carried out in conjunction with a computer for directly creating a new document from a pre-existing file, the method comprising:
   selecting an option from a menu for creating a new unnamed file having no file name associated therewith from a pre-existing file;
   designating, in a dialog displayed in response to selecting the option, a specific pre-existing file name corresponding to the pre-existing file;
   inputting the specific pre-existing file name to initiate creation of the new unnamed file and to initiate selectively copying by the user part or the entire information from the specific pre-existing file to the new unnamed file; and
   saving the unnamed new file with a new file name in response to a displayed dialog requiring a specified new file name for the new file upon a first save operation of the new file, wherein the new file resulting therefrom is the new document itself rather than solely an intermediary file from which the new document can therefrom be created.

10. The method of claim 9 wherein said new file includes a subportion of the data of the specific pre-existing file.

11. A computer program on a computer-usable medium for directly creating an intended document from a pre-existing file, the computer program comprising:
   means for causing a displaying to a user of a selectable option for creating a new file like the pre-existing file;
   means for creating a capability to receive as input a file name of the pre-existing file;
   means for causing by the user a selectively copying part or the entire information of the pre-existing file to create the new file in response to input of the pre-existing file name, wherein the new file is created devoid of a file name;
   means for denying assignment of a new file name to the new file upon creation of the new file;
   means for requiring a designation of a new file name for the new file upon a first save of the new file by the user, wherein the new file resulting therefrom is the intended document requiring no intermediary file from which the intended document would therefrom be created.

12. A file management system having a memory and processor comprising:
   a file menu function wherein a requested file containing data having a predefined file name is designated to be opened as a new file without a file name associated with the new file when the file menu function is selected, wherein the new file corresponds to an intended document;
   a file copier allowing the user to selectively copy part or the entire for copying the requested file in memory as the new file, and disassociating the predefined file name with the new file such that the new file is open for modification without allowing overwriting of the requested file in response to a save command; and a file namer requiring a new name for the new file prior to closing the new file in response to a save command.

13. The file management system of claim 12 wherein each file comprises a plurality of fields, each field containing pre-specified data and the system further comprising:

a common field designator wherein for each field designated as a common field, each corresponding field of the new file and the requested file contain identical data and each corresponding field not designated as a common field is empty.

14. The file management system of claim 12 wherein the file template function comprises a menu bar selector.

15. The file management system of claim 12 wherein each file corresponds to printer files wherein a user specifies a plurality of items for printing and parameters for printing the items.

16. The file management system of claim 12 wherein each file is a document.

\* \* \* \* \*